(12) United States Patent
Canova et al.

(10) Patent No.: US 7,171,986 B2
(45) Date of Patent: Feb. 6, 2007

(54) AIRFLOW CONVERGER

(75) Inventors: Carlos Augusto Canova, São Paulo (BR); Fábio Moreira, São Paulo (BR)

(73) Assignee: Sogefi Filtration do Brasil LTDA, Sao Paulo (BR)

( * ) Notice: Subject to any disclaimer, the term of this patent is extended or adjusted under 35 U.S.C. 154(b) by 0 days.

(21) Appl. No.: 10/957,495

(22) Filed: Oct. 1, 2004

(65) Prior Publication Data

US 2005/0247361 A1 Nov. 10, 2005

(30) Foreign Application Priority Data

May 6, 2004 (BR) .................................... 0401703

(51) Int. Cl.
 *F15D 1/00* (2006.01)
(52) U.S. Cl. .................. 138/37; 138/39; 138/DIG. 4; 55/385.3
(58) Field of Classification Search .............. 138/37, 138/39, DIG. 4; 285/179, 132.1; 454/3, 454/11; 55/385.3, 331, DIG. 28
See application file for complete search history.

(56) References Cited

U.S. PATENT DOCUMENTS

| | | | | |
|---|---|---|---|---|
| 843,413 A | * | 2/1907 | McKeen, Jr. ................ | 55/461 |
| 1,213,829 A | * | 1/1917 | Boehne ........................ | 454/11 |
| 1,374,866 A | * | 4/1921 | Spencer .................. | 285/148.24 |
| 1,828,816 A | * | 10/1931 | Pierson ......................... | 96/338 |
| 3,722,275 A | * | 3/1973 | Rodely et al. ........... | 73/861.22 |
| 3,757,751 A | * | 9/1973 | Kitchin et al. .............. | 123/566 |
| 3,892,546 A | * | 7/1975 | Grisell ......................... | 96/62 |
| 3,987,862 A | * | 10/1976 | Lidstone .................... | 180/68.1 |
| 4,157,902 A | * | 6/1979 | Tokar ......................... | 55/385.3 |
| 4,159,899 A | * | 7/1979 | Deschenes ................... | 55/454 |
| 4,212,659 A | * | 7/1980 | Magrini ..................... | 55/385.3 |
| 4,373,940 A | * | 2/1983 | Petersen ...................... | 55/328 |
| D273,956 S | * | 5/1984 | Petersen ....................... | D15/5 |
| 6,739,306 B2 | * | 5/2004 | Linsbauer et al. ...... | 123/198 E |
| 2005/0247034 A1 | * | 11/2005 | Canova et al. ............. | 55/385.3 |

* cited by examiner

*Primary Examiner*—Patrick F. Brinson
(74) *Attorney, Agent, or Firm*—Greer, Burns & Crain, Ltd.

(57) ABSTRACT

An airflow converger belonging to the field of auto parts, that was developed to improve air supply conditions and performance of internal combustion engines includes: a tubular body equipped at an upper end with an air inlet, having parallel fins that direct airflow lines in parallel; internally, the body has an inner surface that acts on the airflow; and an opposite end of the body has an outlet positioned horizontally and connected to an air receiving medium like a carburetor or throttle body of a vehicle's engine system, the airflow lines flowing in parallel as they move through the body from the inlet to the outlet.

5 Claims, 1 Drawing Sheet

AIRFLOW CONVERGER

This descriptive report refers to an invention patent for an airflow converger belonging to the field of auto parts, and which was developed to improve air supply conditions and the performance of internal combustion engines.

The air supply system for internal combustion engines typically includes: air intake(s) open to the environment; an air filter connected to or incorporating the air intake(s) and connected to the carburetor inlet or throttle body; and in certain cases, part of the system for noise reduction and others. In the system with this solution, the airflow supplied is turbulent with high rates of recirculation (Kinetic energy of turbulence, turbulence intensity, vortex number). According to findings from studies conducted, such air supply conditions determine decrease in power and torque, especially in Otto cycle engines.

Thus, the objective of the invention is to provide a device that solves the problem above.

Another objective is to provide a device that solves the problem without requiring a structure and manufacture with levels of complexity that renders it uninteresting.

Another objective is to provide a device that can be applied in air supply systems already existing in vehicles or be introduced in designs of vehicles under development.

Another objective is to provide a device that can be used separately in an admission system or in association with an air filter system.

Another objective is to provide a device of low cost.

Considering, therefore, the abovementioned problems, with the aim of solving them and meeting the objectives listed, the present airflow converger was developed, which essentially includes a tubular body equipped at one end with a broadened inlet provided with two fins that direct the entering airflow; in an intermediary region, the body has a curved, funneled section and is directed downwards, having an inner surface selected to convert the air flow into laminar flow with minimized or annulled recirculation rate and turbulence intensity; and an opposite end of the body includes an air outlet, connected to an inlet of a carburetor or throttle body.

This device in the inlet of the vehicle engine assembly's carburetor or throttle body promotes the alignment of the fluid current lines in constant or variable flow rate conditions. Also, this device's geometrical form causes the airflow operating in turbulent conditions with high recirculation rates, after passing through the device, to be modified and operate in laminar flow conditions, with minimized or annulled recirculation rate and turbulence intensity.

The characteristics configured to the airflow after passing through the device promote gain in power and torque when applied in internal combustion engines, preferentially those operating in Otto cycle.

Another advantage of this device consists in the fact that, despite its being adequate the purpose for which it is intended, it has a simple structure and manufacturing, which does not complicate nor burden the part or its process of obtainment.

Furthermore, this device, as can be easily seen, can be applied in already existing vehicles or be introduced in designs of vehicles under development.

Another advantage is the device's easy installation and the fact that it practically needs no maintenance or repair.

The attached drawings refer to the airflow converger object of this patent, in which.

Figure 1:
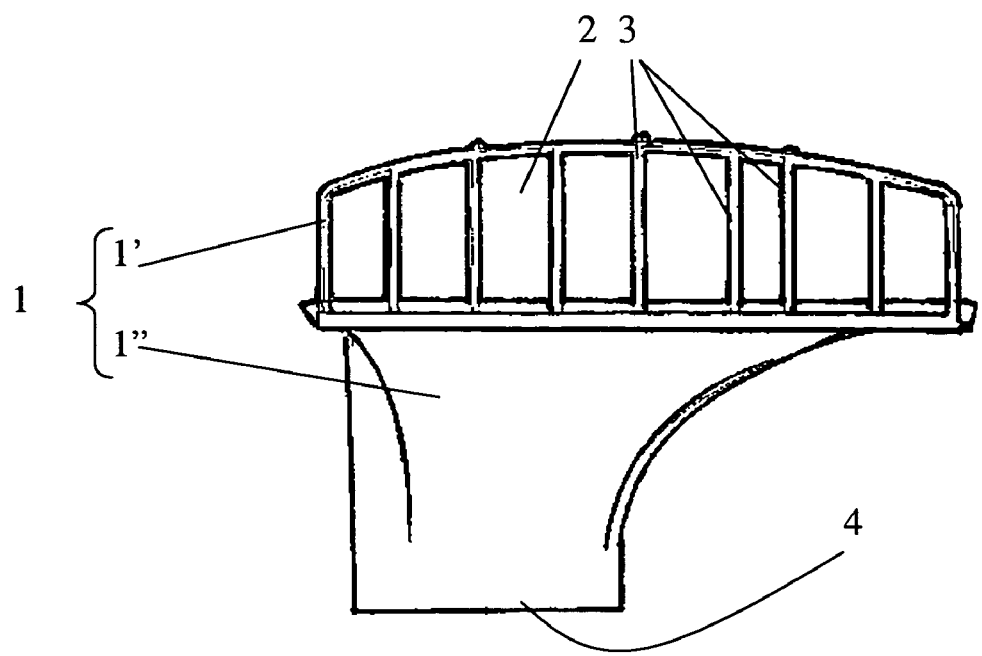
FIG. 1 shows it separately.
Figure 2:
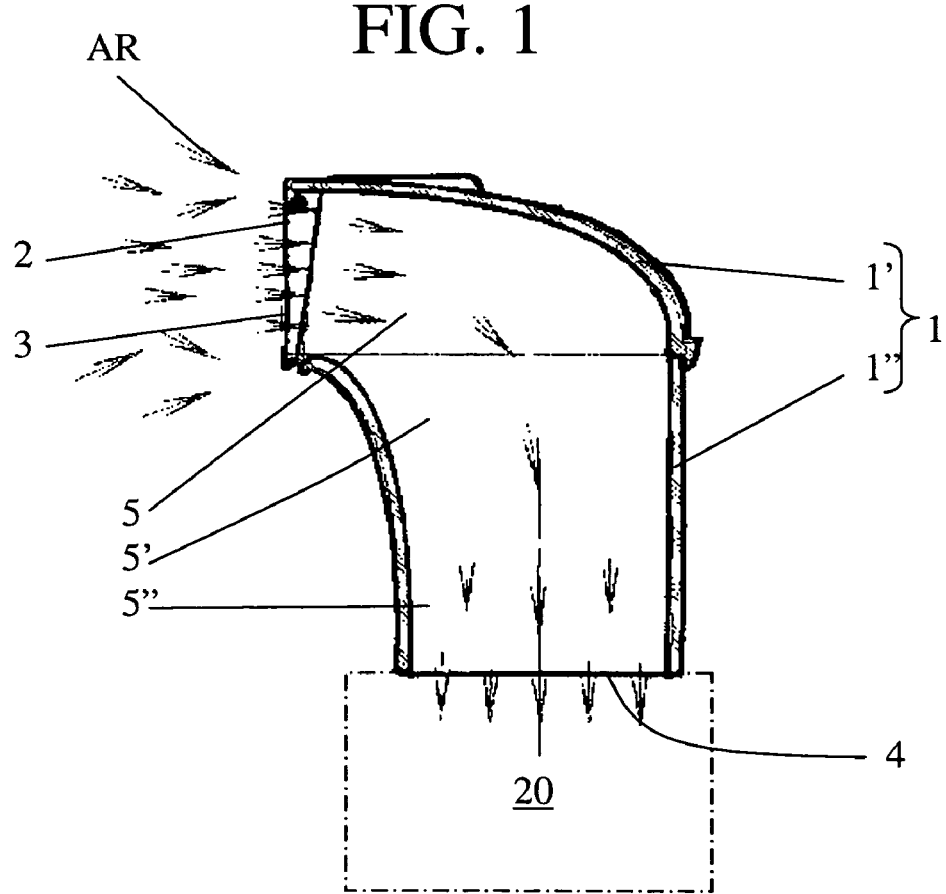
FIG. 2 shows a side section with indication of how it is assembled in the air supply circuit of a vehicle.

As shown by the above listed figures, the present airflow converger is intended to direct and align the current lines and change the flow condition of air supplied in an internal combustion engine, and includes, essentially: a tubular body 1, defined by a broadened upper section 1' in an essentially prismatic form with convex walls, and that has an inlet 2 in a vertical plane, equipped with fins 3 and open to the environment or connected to the outlet of an air filter; the body 1 is also defined by a lower section 1" in a substantially cone frustum format, funneled from a base of the upper section 1' and ending in a cylindrical section equipped having an outlet 4 in a horizontal plane and connected to an air receiving medium 20 of the vehicle engine system, like a carburetor or a throttle body.

Internally, the body 1 defines the surface acting on the airflow, defined by an upper region 5 essentially in a semi-parabolic format, with an axis of revolution substantially coinciding with a vertical medial axis of the inlet 2; by an intermediary region 5' essentially in the form of a cone frustum that extends and is funneled from the upper region; and by a cylindrical lower region 5" extended from the intermediary region, the surface adapted to change the airflow condition from turbulent to laminar and to minimize or annul the recirculation rate and turbulence intensity.

The air inlet 2 is basically rectangular with horizontal dimension substantially greater than the vertical and has fins 3 in vertical position and spaced from each other.

The converger can be used separately in admission systems or in association with a filter set.

Thus, the converger works as follows: The ambient air or the air that leaves an air filter is collected by the inlet 2 and on passing through the fins 3 it is directed in parallel flow lines. On moving through the converger's interior, the adapted geometry of the inner surface 5 changes the airflow condition from turbulent with high recirculation rate to laminar with minimized or annulled recirculation rate and turbulence intensity. In these conditions, the air leaves the converger outlet 4 and enters the engine carburetor or throttle body 20, providing the engine with gain in power and torque.

In the basic structure above described, the present airflow converger can present modifications related to materials, dimensions, constructive details and/or functional/decorative configuration, without deviating from the scope of the protection desired.

Within this, the converger can be made in a single or two or more parts, one assembled to the other as desired, and be obtained by injection of thermoplastic polymers or stamping of thin plates, or injection of aluminum and its alloys or others.

The converger can also incorporate means for noise reduction and/or other devices useful to the air supply system.

The invention claimed is:

1. An airflow converger comprising: a tubular body equipped, at an upper end, with an air inlet in a vertical plane open to the environment or connected to the outlet of an air filter and provided with spaced, parallel, vertically oriented, nonintersecting fins that direct airflow lines in parallel; internally, said body has an inner surface for changing turbulent airflow with high recirculation rate to laminar airflow with minimized or annulled recirculation rate and turbulence intensity upon exit from the body; and an opposite end of said body has an outlet positioned horizontally and connected to an air receiving medium like a carburetor or throttle body of a vehicle's engine system; said airflow lines flowing in parallel as they move through said body from said inlet to said outlet;

wherein the tubular body is defined by a broadened upper section, prismatic, with convex walls, and with said inlet; said body is also internally obstruction-free and defined by a lower section in a substantially cone frustum format, funneled from a base of the upper section and ending in a cylindrical section having said outlet.

2. The airflow converger according to claim 1, wherein the air inlet is basically rectangular with a horizontal dimension substantially greater than a vertical dimension.

3. An airflow converger comprising: a tubular body equipped, at an upper end, with an air inlet in a vertical plane open to the environment or connected to the outlet of an air filter and provided with spaced, parallel, vertically oriented, nonintersecting fins having flat, parallel sides that direct airflow lines in parallel; internally, said body has an inner surface for changing turbulent airflow with high recirculation rate to laminar airflow with minimized or annulled recirculation rate and turbulence intensity upon exit from the body; and an opposite end of said body has an outlet positioned horizontally and connected to an air receiving medium like a carburetor or throttle body of a vehicle's engine system; said airflow lines flowing in parallel as they move through said body from said inlet to said outlet; said tubular body being internally obstruction-free and defined by a broadened upper section, prismatic, with convex walls, and with said inlet; said body also being defined by a lower section in a substantially cone frustum format, funneled from a base of the upper section and ending in a cylindrical section having said outlet; the inner surface being defined by an upper region in an essentially semi-parabolic format, with an axis of revolution substantially coinciding with a vertical medial axis of the inlet, by an intermediary region essentially in a cone frustum format, that extends and is funneled from a base of the upper region, and by a cylindrical lower region extending from the intermediary region up to the outlet.

4. An airflow converger comprising: a tubular body equipped, at an upper end, with an air inlet in a vertical plane open to the environment or connected to the outlet of an air filter and provided with spaced, parallel, vertically oriented, nonintersecting fins that direct airflow lines in parallel; internally, said body has an inner surface for changing turbulent airflow with high recirculation rate to laminar airflow with minimized or annulled recirculation rate and turbulence intensity upon exit from the body; and an opposite end of said body has an outlet positioned horizontally and connected to an air receiving medium like a carburetor or throttle body of a vehicle's engine system; said airflow lines flowing in parallel as they move through said body from said inlet to said outlet;

wherein the inner surface is defined by an upper region in an essentially semi-parabolic format, with an axis of revolution substantially coinciding with a vertical medial axis of the inlet; by an intermediary region essentially in a cone frustum format, that extends and is funneled from a base of the upper region; and by a cylindrical lower region extending from the intermediary region up to the outlet.

5. The airflow converger according to claim 4, wherein the air inlet is basically rectangular with a horizontal dimension substantially greater than a vertical dimension.

* * * * *